United States Patent
Novak et al.

(10) Patent No.: US 9,716,632 B2
(45) Date of Patent: Jul. 25, 2017

(54) INTERACTIVE LAYERED VISUALIZATION OF A LAYERED SOFTWARE ARCHITECTURE

(75) Inventors: Miroslav Novak, Prague (CZ); Albert Regner, Karlovy Vary (CZ); Roman Rubas, Prague (CZ)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1182 days.

(21) Appl. No.: 12/862,216

(22) Filed: Aug. 24, 2010

(65) Prior Publication Data
US 2012/0054714 A1    Mar. 1, 2012

(51) Int. Cl.
H04L 12/24    (2006.01)
G06F 3/0482    (2013.01)

(52) U.S. Cl.
CPC ............ H04L 41/14 (2013.01); G06F 3/0482 (2013.01); H04L 41/0853 (2013.01); H04L 41/22 (2013.01); H04L 41/12 (2013.01)

(58) Field of Classification Search
CPC ....... G06F 3/0482; H04L 41/12; H04L 41/14; H04L 41/22; H04L 41/0853
See application file for complete search history.

(56) References Cited

U.S. PATENT DOCUMENTS

| | | | |
|---|---|---|---|
| 5,835,085 A * | 11/1998 | Eick et al. ..................... 715/853 |
| 2005/0138057 A1 * | 6/2005 | Bender et al. ................. 707/102 |
| 2005/0256882 A1 * | 11/2005 | Able et al. ..................... 707/10 |
| 2008/0046259 A1 * | 2/2008 | Johnston ........................... 705/1 |
| 2008/0104570 A1 * | 5/2008 | Chedgey et al. ............. 717/105 |
| 2008/0317217 A1 * | 12/2008 | Bernardini et al. ........ 379/32.03 |
| 2009/0158237 A1 * | 6/2009 | Zhang et al. ................. 717/100 |
| 2010/0030890 A1 * | 2/2010 | Dutta et al. ................... 709/224 |
| 2010/0058113 A1 * | 3/2010 | Rapp et al. ..................... 714/38 |
| 2010/0063785 A1 * | 3/2010 | Pich et al. ........................ 703/6 |
| 2010/0146479 A1 * | 6/2010 | Arsanjani et al. ............ 717/105 |

OTHER PUBLICATIONS

Lin, "A Reference Architecture for Scientific Workflow Management Systems and the VIEW SOA Solution," Jan.-Mar. 2009, IEEE Transactions on Services Computing, vol. 2, No. 1, pp. 79-92.*
Pich, "Visual Analysis of Importance and Grouping in Software Dependency Graphs," 2008, Proceedings of the 4th ACM Symposium on Software Visualization, pp. 29-32.*
Kumar, "Organizing UML Class Diagrams in Layers," 2005, Information and Communications Technology, Enabling Technologies for the New Knowledge Society: ITI 3rd Int. Conf., pp. 39-55.*

* cited by examiner

Primary Examiner — Ivan R Goldberg
(74) Attorney, Agent, or Firm — Trop, Pruner & Hu, P.C.

(57) ABSTRACT

A system to generate an interactive layered visualization of a software system includes a storage device to storage a model of the system that defines entities and relationships among entities. The system also includes a visualization tool to generate nodes representing the entities and assign nodes to layers in a set of ordered layers in accordance with rules associated with each layer. A layered layout of the software system is thereby generated and an interactive visualization of the layered layout is rendered for display to the user.

25 Claims, 16 Drawing Sheets

INTERACTIVE LAYERED VISUALIZATION OF A LAYERED SOFTWARE ARCHITECTURE

BACKGROUND

A priority of many business organizations is to deliver new products, such as software system solutions, as quickly as possible at the lowest possible cost. Achieving this goal can be difficult if detailed information about the software systems, such as system architecture and relationships between system components, is not properly maintained. Accordingly, businesses are increasingly using repositories (e.g. Service-Oriented Architecture (SOA) repositories, Application Lifecycle Management (ALM) repositories, etc.) to keep track of their software portfolios. The use of repositories, which maintain detailed models of the software products, has significantly improved traceability and visibility of complex software systems. However, due to the increasing size and complexity of the information maintained in the repositories, a proper understanding of the architecture and interrelationships between the various components of the software systems can be difficult, creating obstacles to achieving the goal of quickly reviewing, updating, designing and optimizing software products in response to customer demands and rapidly changing conditions in the marketplace.

BRIEF DESCRIPTION OF THE DRAWINGS

Some embodiments are described with respect to the following figures.

DETAILED DESCRIPTION

Figure 1:
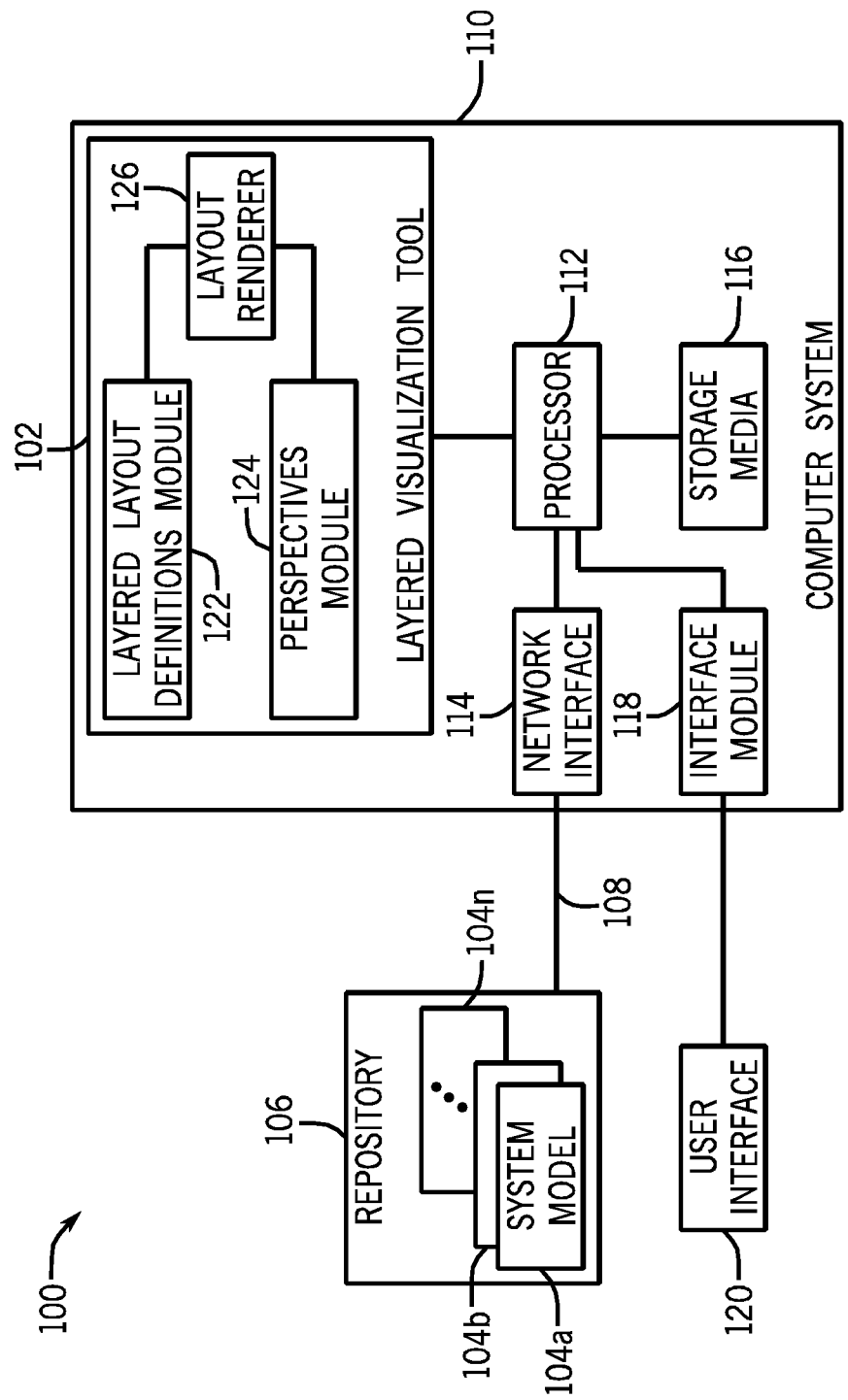
FIG. 1 is a block diagram of an exemplary layered layout visualization system, in accordance with an embodiment.

Many business organizations maintain repositories that contain detailed models of the organizations' software products. These models provide a vast range of information, from low level detailed technical information about the various entities of the software system to high level information that defines relationships between the various entities. For large systems, this vast range of information becomes very complex, making it difficult to gain a thorough understanding of the software product. Without a thorough understanding, system architects and designers may find it difficult to readily identify potential problems, such as bad patterns or violations of architecture best practices, or quickly implement changes in one area of the system that in all likelihood will impact others portions of the system.

Accordingly, embodiments of the invention provide a visualization technique and tool that enable real-time and interactive visualization of the architectures of software systems that have complex organizational structures. Preferably, a visualization of a software system should reflect the structures that the architecture defines in a manner that makes them intelligible to a user. Thus, exemplary embodiments of the visualization technique and tool leverage two features of software system architectures: layers and hierarchies. When implemented using exemplary visualization techniques described herein, layers provide for organization of the numerous entities in the system in a manner that makes the most sense to the user. Hierarchies reflect the relationships and dependencies between entities. A layered visualization that has a hierarchical structure can greatly facilitate the user's understanding of the overall system and the relationships among its various components.

To generate a visualization that organizes entities into logical layers and which preserves the hierarchical structure of the overall system, exemplary embodiments of the visualization tool interface with pre-existing models of software systems that are maintained, for instance, in a repository. A software system typically has a large numbers of entities (e.g., millions), and the models provide a variety of information about the entities, such as, classifications, properties, relationships with other entities, etc. In exemplary embodiments, the visualization tool can read this information from the repository, compute a layered layout that is arranged in accordance with a hierarchical structure of the software system, and render an interactive visual representation of the system in accordance with parameters that have been defined by a user.

In exemplary embodiments of the visualization, the entities are generally organized as nodes that are divided into a set of ordered layers. The nodes are interconnected by edges that represent the relationships between the various entities. In some embodiments, the user of the visualization tool may define an arbitrary set or sets of ordered layers together with rules that place the various entities into the layers in a manner that the user finds useful for understanding the architecture of the system. Because not all relationships may define hierarchies, the user also may specify which relationships in the model define the hierarchical structure and, thus, the manner in which the layered layout will be arranged.

The visualization tool then lays out the nodes based on the user-defined information. In general, nodes of the same type (e.g., having the same properties or classifications) are placed in a particular layer. These nodes are referred to as sibling nodes. Any node in the visualization may have children nodes (e.g., a process node may have a sub-process child node; a component node may have a sub-component child node; etc.). Children nodes may be members of lower layers (or even below all layers) or may be a member of the same layer as its parent node (but displayed below the parent in that layer). Edges interconnect nodes in accordance with the relationships in the system model that define a hierarchical structure. Accordingly, as can be seen in the example shown in FIG. 4, the rendered visualization may appear as a layered, tree-like structure that reflects the hierarchical structure of the software system.

In exemplary embodiments, once rendered, the user can interact with the visualization by, for instance, repositioning nodes and sub-trees, adding and removing nodes, adding and removing details, etc., all without disturbing the underlying hierarchical structure of the visualization. This can be a particularly useful feature since not all users will be interested in the same type of information or the same level of detail that may be provided by a visualization. Because the hierarchical structure is preserved, a user can interact with the visualization in the manner that best suits the user's particular needs without losing any information.

FIG. 1 provides a block diagram of one embodiment of a system 100, including a visualization tool 102 that can be used to generate an interactive, layered visualization of a model of a software system that is maintained in a repository 106. In some embodiments, the repository 106 includes one or several storage devices to store a plurality of models 104a-n representing an organization's software product portfolio. The repository 106 may be part of a storage system that may include one or several storage devices, such as storage disks, magnetic memory devices, optical memory devices, flash memory devices, etc.

The repository 106 is coupled to the visualization tool 102 via a communication network 108, such as the Internet, an intranet, local network wireless network, wide area network, combinations of the foregoing, etc. The visualization tool 102 may be maintained on a computing system 110 and may be executable on a processor 112 in the computer system 110. The processor 112 is connected through a network interface 114 to the communication network 108. In addition, the processor 112 is connected to storage media 116, which can be implemented with one or several disk-based storage devices and/or one or several integrated circuit (IC) or semiconductor storage devices.

The computing system 110 may also include an appropriate interface module 118 to allow the visualization tool 102 to output the visualization to a user interface 120 that includes, for instance, a display, keyboard, mouse, etc. The user interface 120 may be local to the computing system 110 or may be provided by a client computer, for instance, that is located remote from the computing system 110.

As shown in the exemplary embodiment of FIG. 1, the visualization tool 102 includes a Layered Layout Definitions Module 122, a Perspectives (or Views) Module 124, and a layout renderer 126. Although shown separately in FIG. 1, all or portions of the visualization tool 102, including the Layout Definitions Module 122, Perspective Module 124 and the renderer 126, may be maintained on storage media 116. As will be explained in greater detail below, Definitions Module 122 and Perspective Module 124 provide for the definition of layers and, views so that a visualization of a particular software system can be computed and rendered by the layout renderer 126 for display to a user via the user interface 120.

Figure 2:
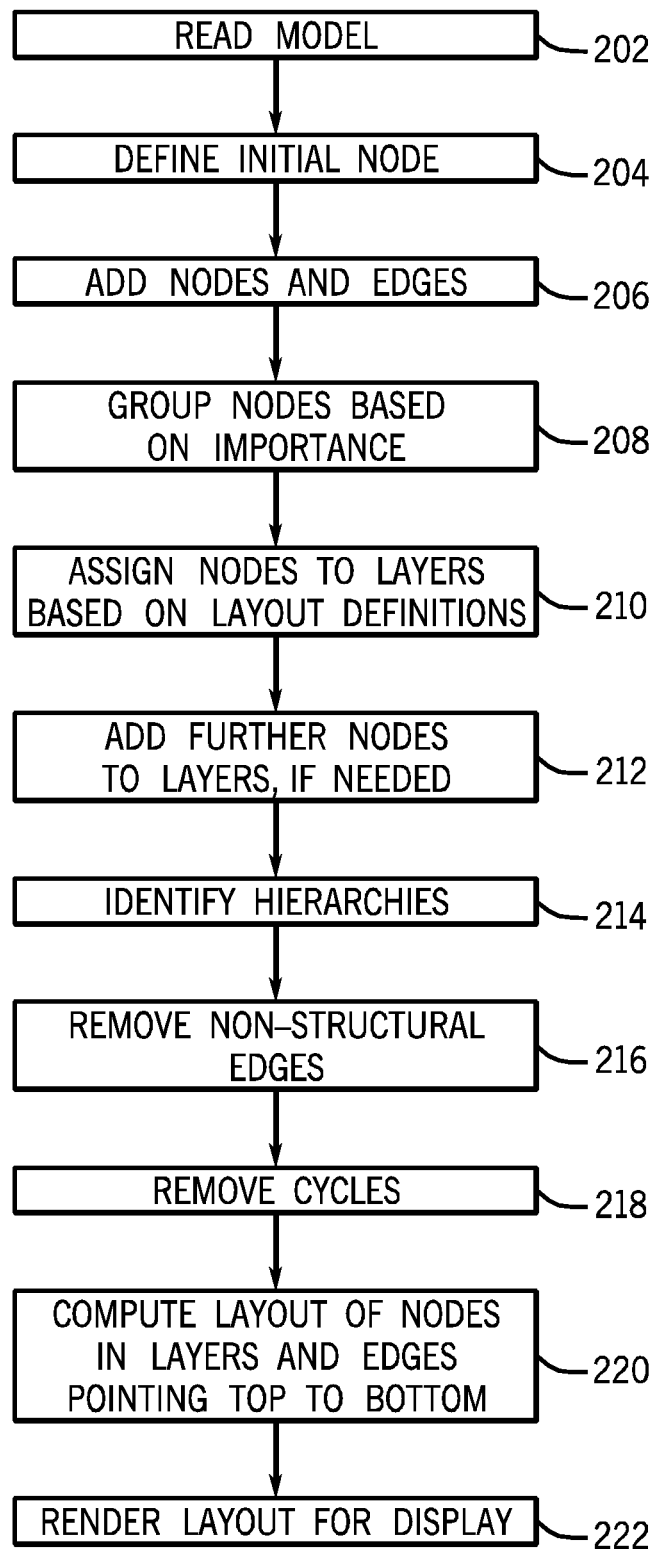
FIG. 2 is a flow diagram of an exemplary layered layout visualization technique, in accordance with an embodiment.

In some embodiments, and as shown in the flow diagram of FIG. 2, when a software system is selected for visualization, the visualization tool 102 reads the associated entities and their relationships from the repository 106 and builds a graph of nodes (representing the entities) and edges (representing the relationships) that the layout renderer 126 renders based on layout and perspective definitions provided by the Layered Layout Definitions Module 122 and the Perspectives Module 124 and in accordance with an identified hierarchical structure of the software system. To construct the graph, the system model(s) 104a-n are read from the repository 106 (block 202), and an initial node is defined that represents the main entity that will be visualized (block 204). Based on the information associated with the initial node, further nodes and edges are added to the graph (block 206). The edges interconnect the nodes based on the relationships defined by the model 104. Sibling nodes (i.e., nodes that are connected to the same node) are grouped together according to their level of importance (as specified in the Perspectives Module 124) (block 208). The nodes are then divided into layers in accordance with the set of layers and rules established in the Layered Layout Definitions Module 122 (block 210). In some embodiments, if all layers are not filled (e.g., there are no nodes or the number of nodes is less than a specified amount) or if the total number of nodes in the graph is less than a specified number, then further nodes may be added (block 212). Hierarchies then are identified and computed for each layer (blocks 214, 216, 218). An ordered layered layout of the nodes, layers, and edges is then computed with the edges pointing from the upper layers towards the lower layers (block 220), and the layout is rendered for display to the user (block 222).

Figure 3:
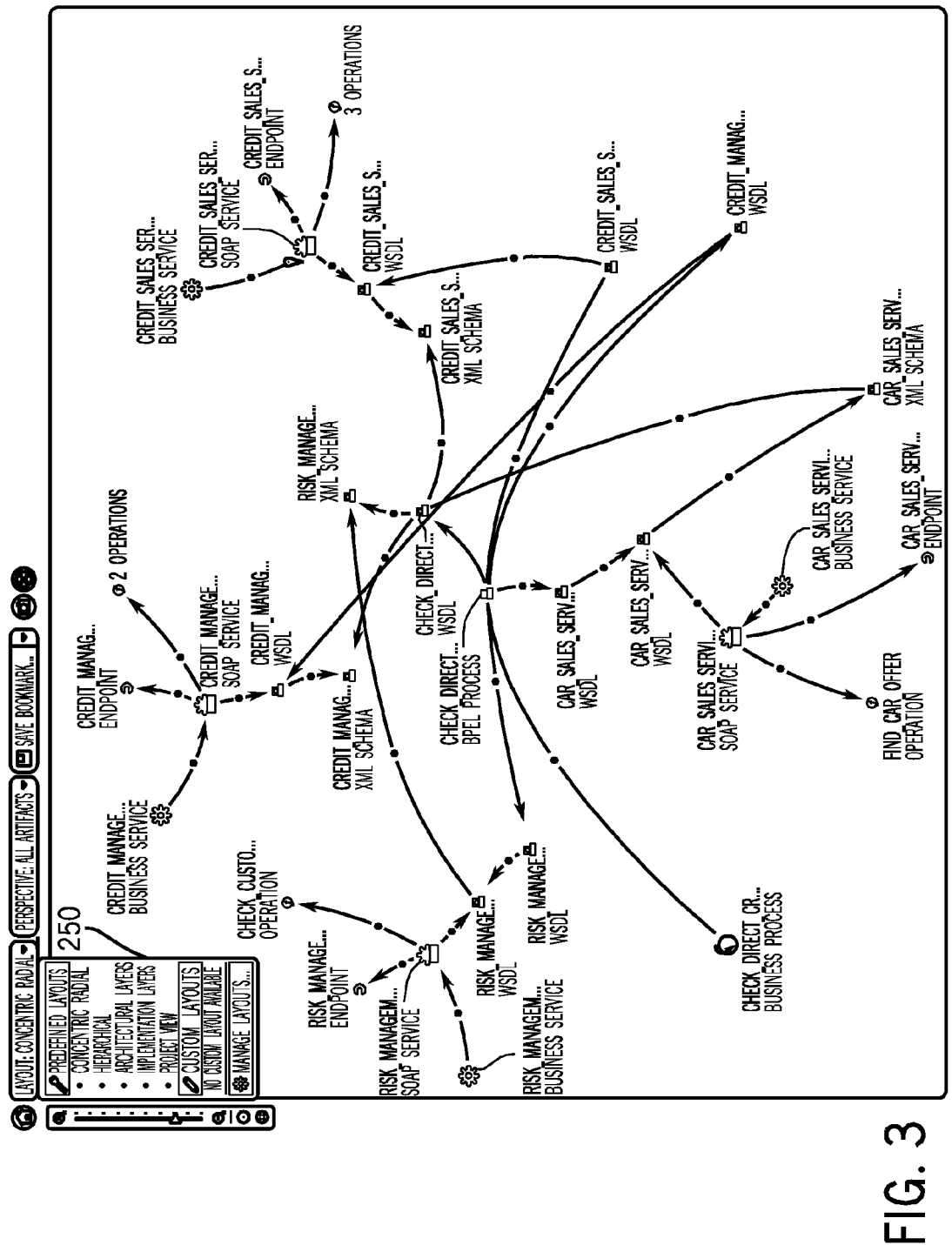
FIG. 3 is a diagram of an exemplary non-layered layout of a software system and an exemplary pulldown menu presenting layered layout options to a user, in accordance with an embodiment.
Figure 4:
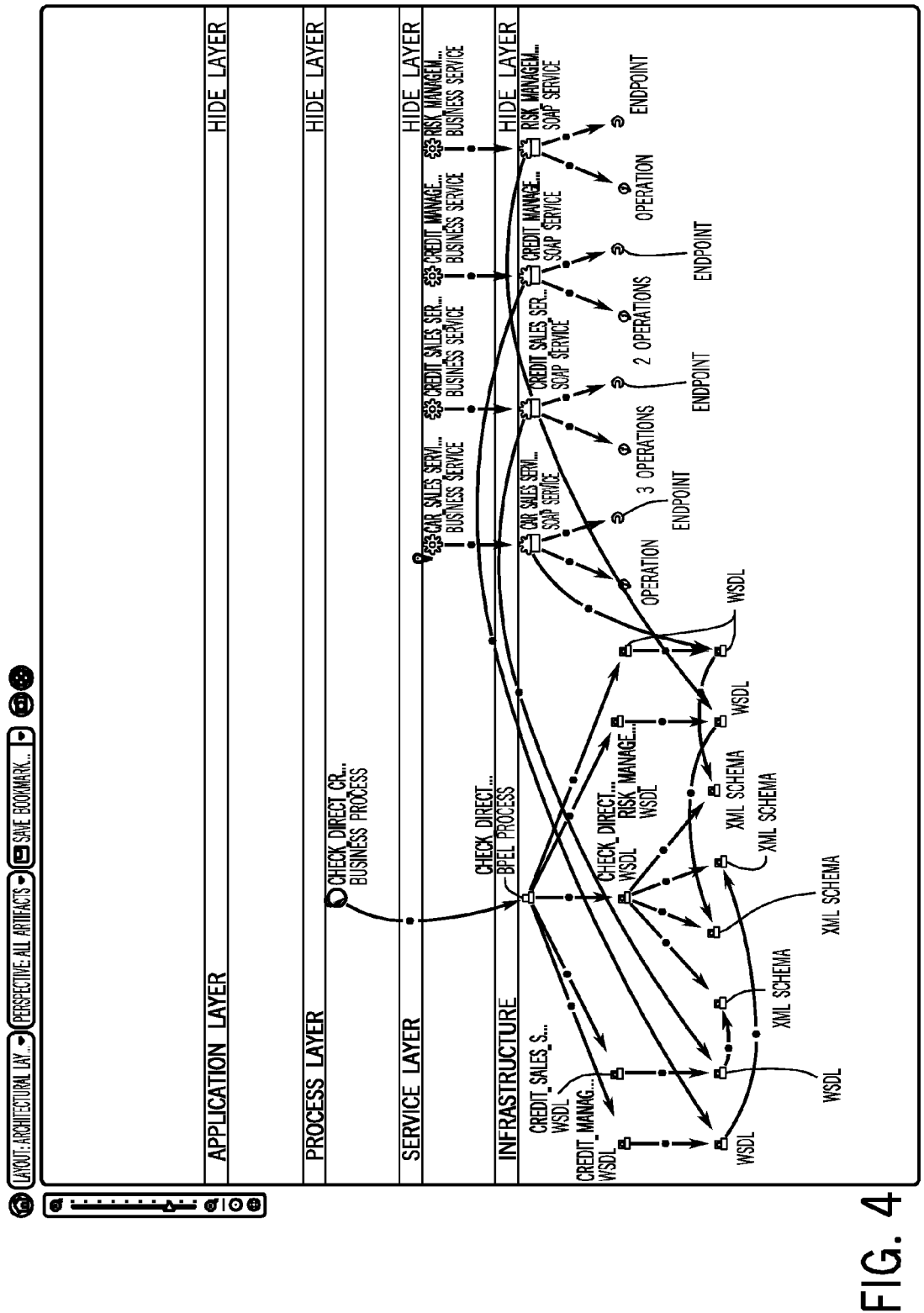
FIG. 4 is a diagram of an exemplary layered layout visualization of a software system, in accordance with an embodiment.

Advantages provided by the visualization tool may be seen by comparing the examples shown in FIGS. 3 and 4. FIG. 3 shows the various entities of a software system laid out in a non-layered manner. These same entities are rendered in a layered layout manner in FIG. 4 to provide an improved understanding of the system that is represented by the visualization.

Layered Layout Definitions Module.

Exemplary embodiments enable configuration of layered layouts via the Layered Layout Definitions Module 122. These definitions define the set(s) of layers and their respective content in accordance with rules. As an example, a layered layout definition may define the types of entities that are members of a particular layer. This definition may be based on the properties associated with the entities in the repository model. Multiple properties may be selected such that entities of different types may be included within a single layer. The definitions also specify conditions that the entities must satisfy. In some embodiments, satisfaction of any one condition may qualify the entity as a member of the layer; while in other embodiments, all conditions must be satisfied.

Figure 5:
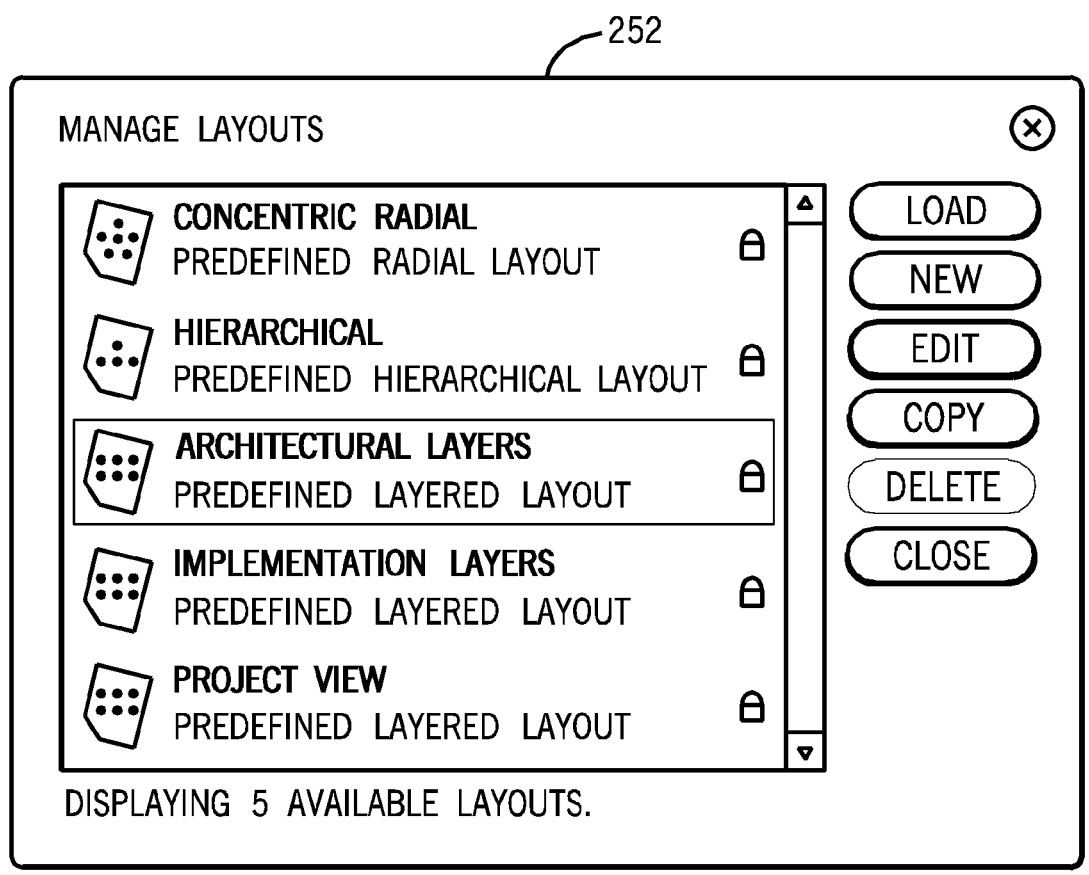
FIG. 5 is an exemplary window presented to a user of an exemplary visualization tool, in accordance with an embodiment.
Figure 6:
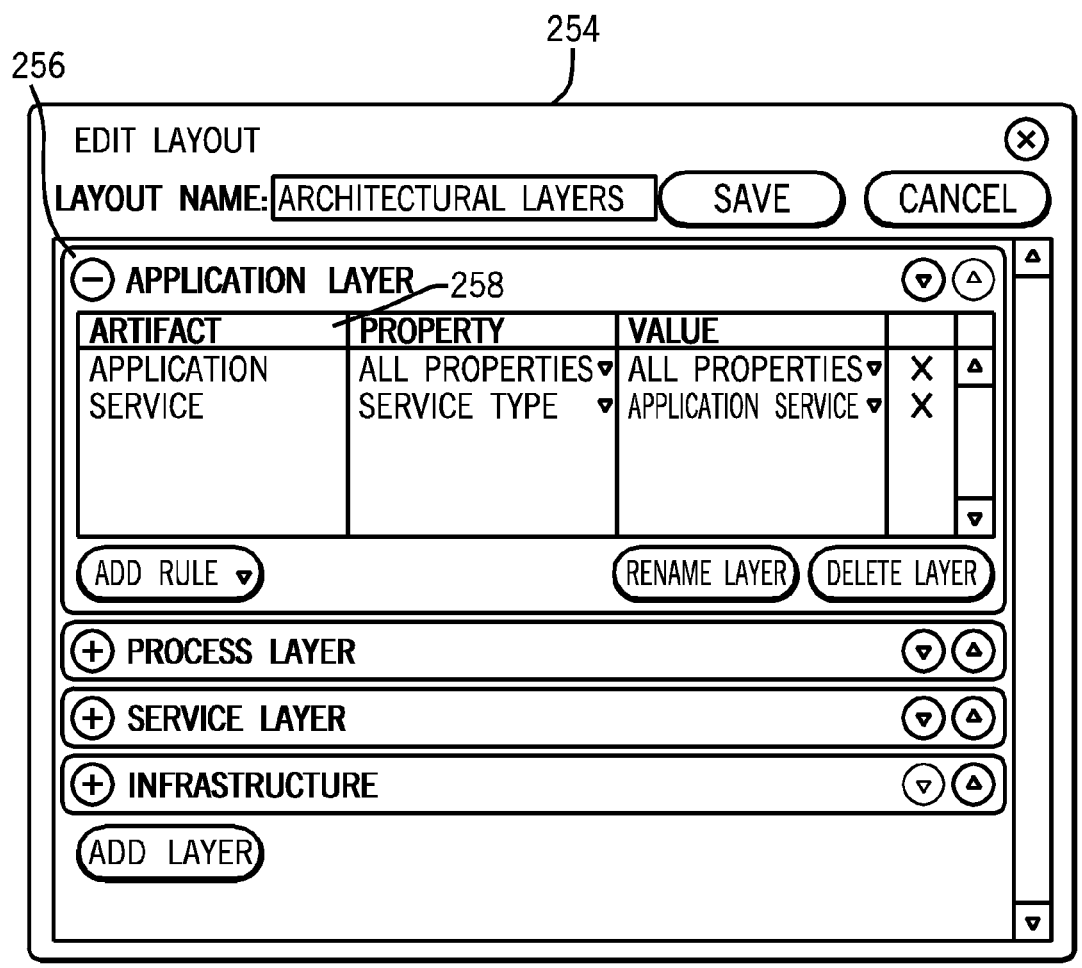
FIG. 6 is another exemplary window presented to a user of an exemplary visualization tool, in accordance with an embodiment.
Figure 7:
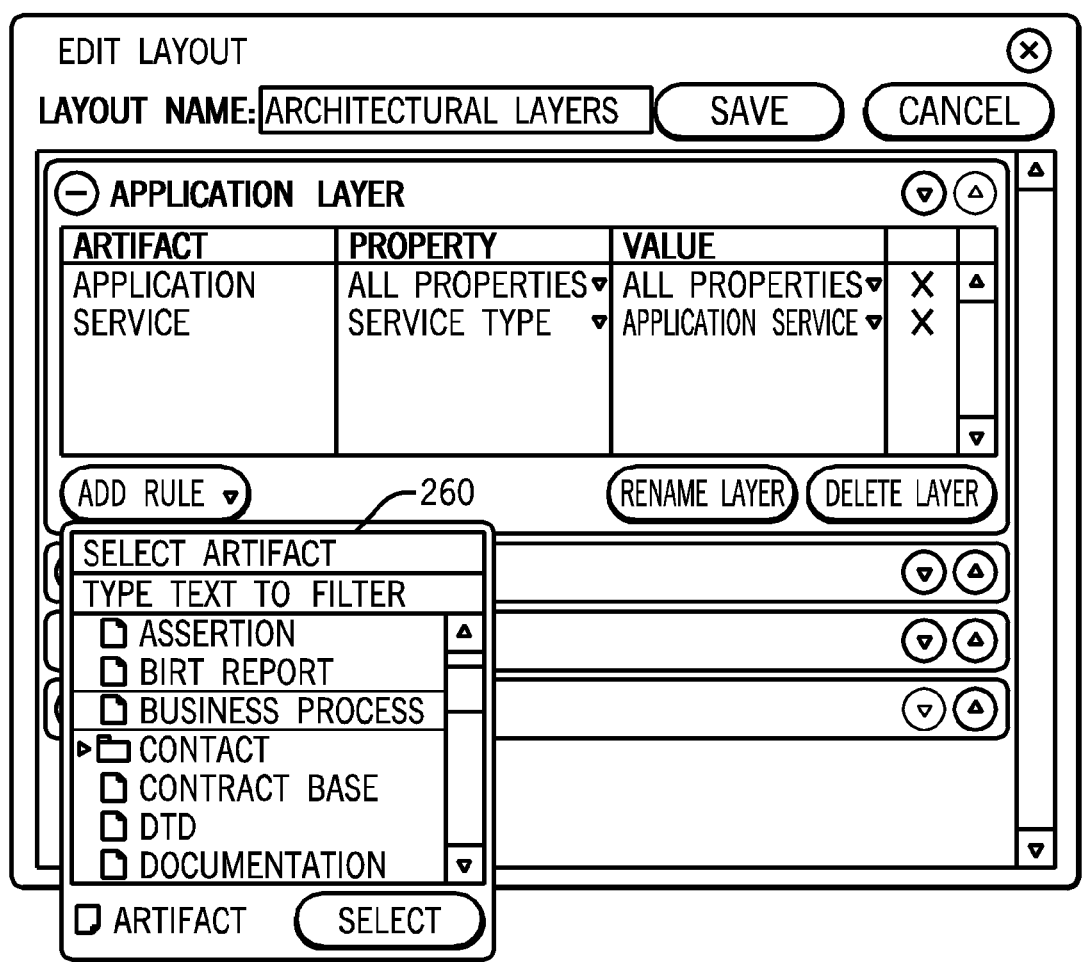
FIG. 7 is another exemplary window presented to a user of an exemplary visualization tool, in accordance with an embodiment.

As an example, and with reference to FIG. 3, the visualization tool 102 may present to the user (via the user interface 120) a pulldown menu 250 listing predefined and custom layout options and the option to manage these layouts. Turning to FIG. 5, a Manage Layouts window 252 is presented to the user when the Manage Layouts option is selected in menu 250. In window, 252, the user may select (and edit) any of the predefined layouts or may opt to establish a new custom layout, including defining a new set of layers and associated rules. In this example, three predefined layered layouts are presented to the user: Architectural Layers, Implementation Layers and Project View. In the example shown, selection of the Architectural Layers layout for editing leads to an Edit Layout window 254 that displays the set of layers (e.g., Application Layer, Process Layer, Service Layer, Infrastructure Layer, etc.) corresponding to the layout, enables the user to define rules for each layer, add, delete and rename layers, etc. To establish rules for a particular layer, the user may expand the layer (e.g., Application Layer 256) in the Edit Layout window and 254 then select the Artifact button 258 to display a pull-down menu 260 (FIG. 7) that can be used to select the type(s) of entities (i.e., Artifacts) that belong to the layer. Types of entities may include, for example, Application, Assertion, Birt Report, Business Process, Contact, Service, etc.

Figure 8:
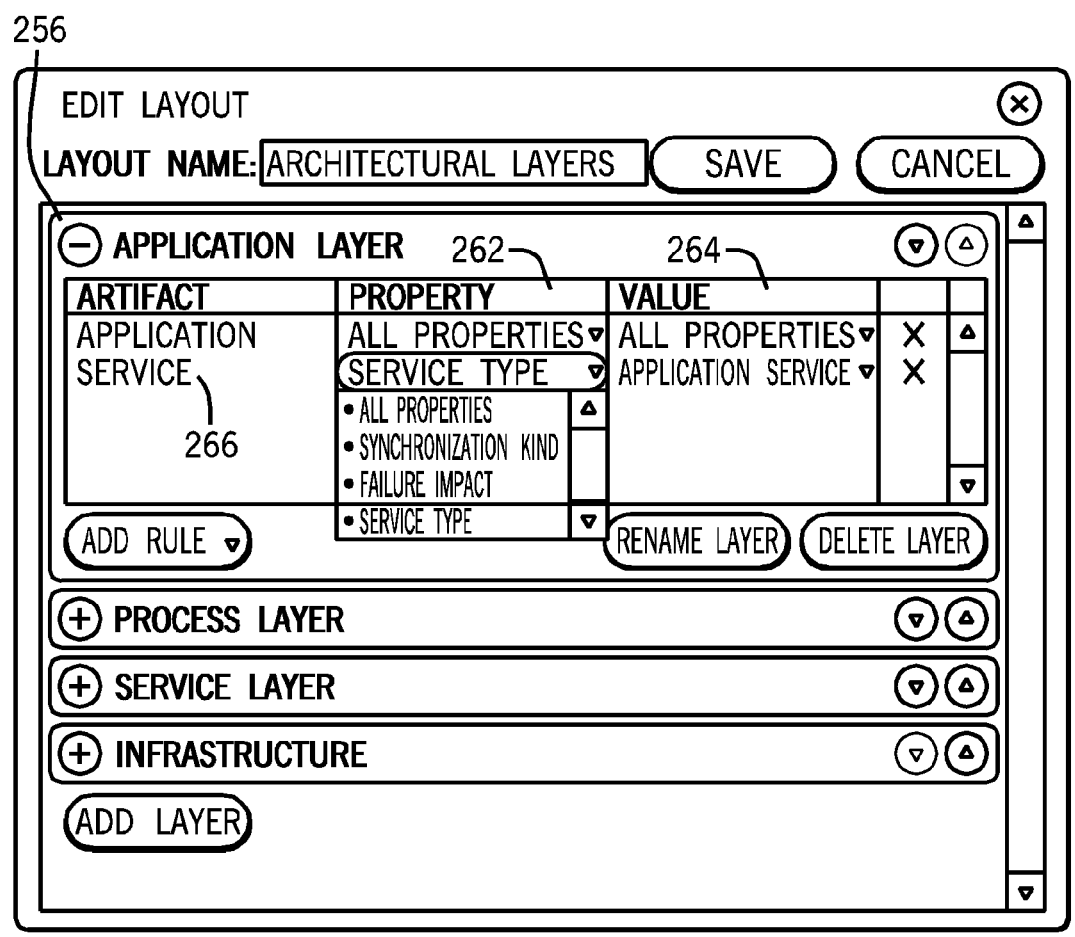
FIG. 8 is another exemplary window presented to a user of an exemplary visualization tool, in accordance with an embodiment.
Figure 9:
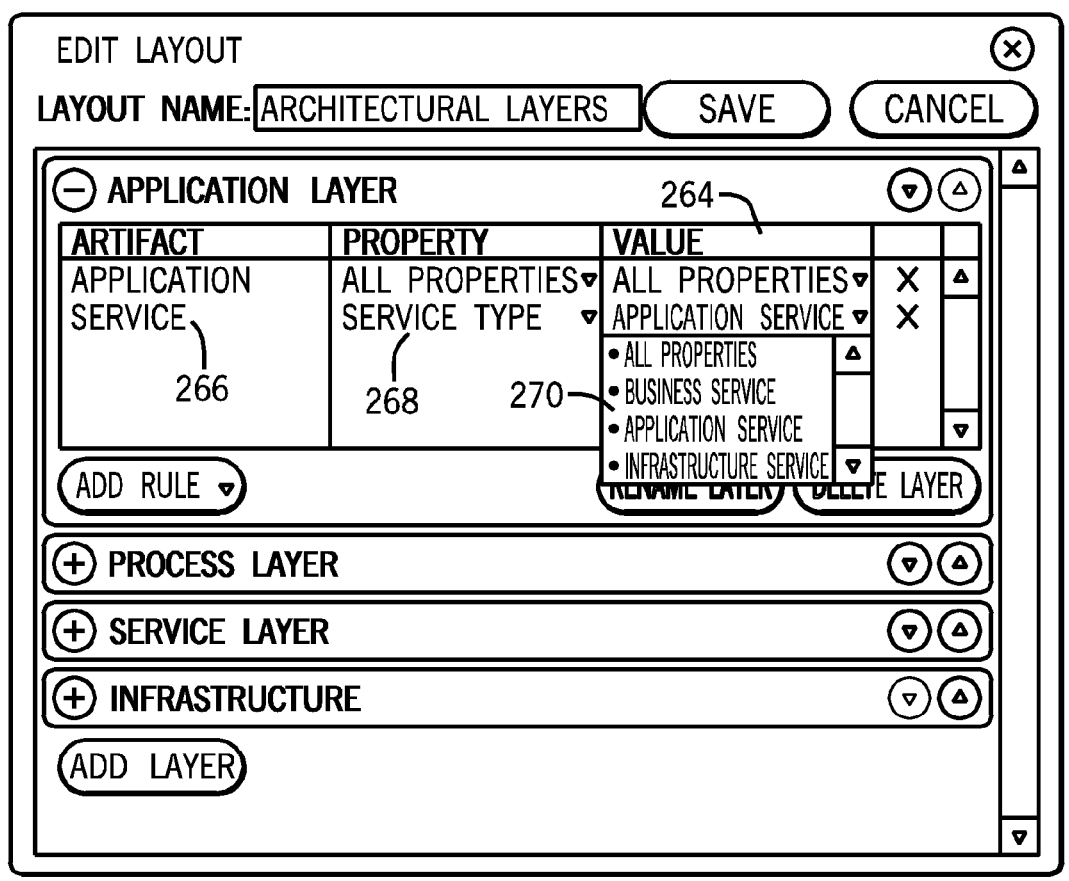
FIG. 9 is another exemplary window presented to a user of an exemplary visualization tool, in accordance with an embodiment.

For each selected type of Artifact, the user may also specify Properties 262 and Values 264. For instance, as shown in FIG. 8, for the Service Artifact 266 included in the Application Layer 256, the user may specify that services having any property (i.e., All Properties) should be included in the Layer 256 or only designated properties (e.g., Synchronization Kind, Failure Impact, Service Type, etc.) should be included in the Layer 256. The user may further specify Values 264 for the specified Properties 262. For instance, as shown in FIG. 9, the user may specify that only Service Artifacts 266 that have a Service Type property 268, where the Service Type is an Application Service 270 should be included in the layer.

It should be understood that the foregoing examples are illustrative only and that the visualization tool 102 may present to the user other or different options in other or different manners to enable the user to define and/or select a set(s) of layers and rules that determine which entities should be placed in particular layers.

Based on the definitions provided by the Layered Layout Definitions Module 122, the visualization tool 102 then divides the nodes in the constructed graph into the appropriate layers. For each node, layer rules are evaluated starting with the rules that have been defined for the topmost layer in the defined set. If a rule is not satisfied, then rules for the next layer in the set are evaluated. If a rule is satisfied, then the node belongs to that layer. If the node does not satisfy any rule, then the node will be rendered below all of the layers. The layers are then rendered as borders wrapping nodes in the layer. If nodes are later repositioned by the user, then the border of the layer extends so that the nodes remain wrapped.

Figure 10:
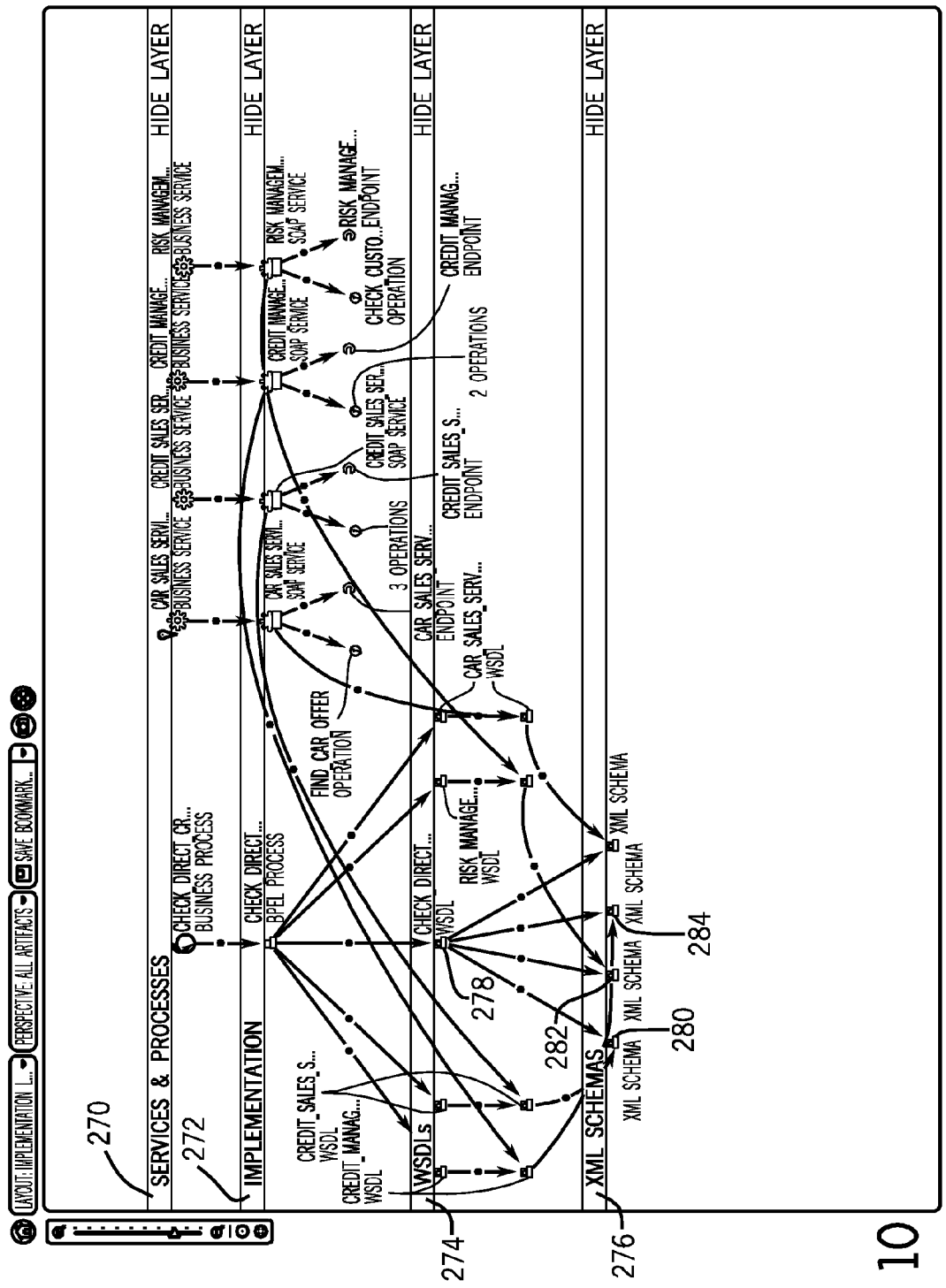
FIG. 10 is a diagram of an exemplary layered layout visualization of a software system, in accordance with an embodiment.

Examples of layered layouts are shown in FIGS. 4 and 10. In FIG. 4, the visualization follows the Architecture Layers layout discussed above. FIG. 10 is a visualization of the same graph of nodes and edges, but which follows an Implementation Layers layout that includes a Services & Processes layer 270, an Implementation layer 272, a WSDLs (i.e., web service definition language) layer 274, and an XML (i.e., extensible markup language) Schemas layer 276.

Figure 11:
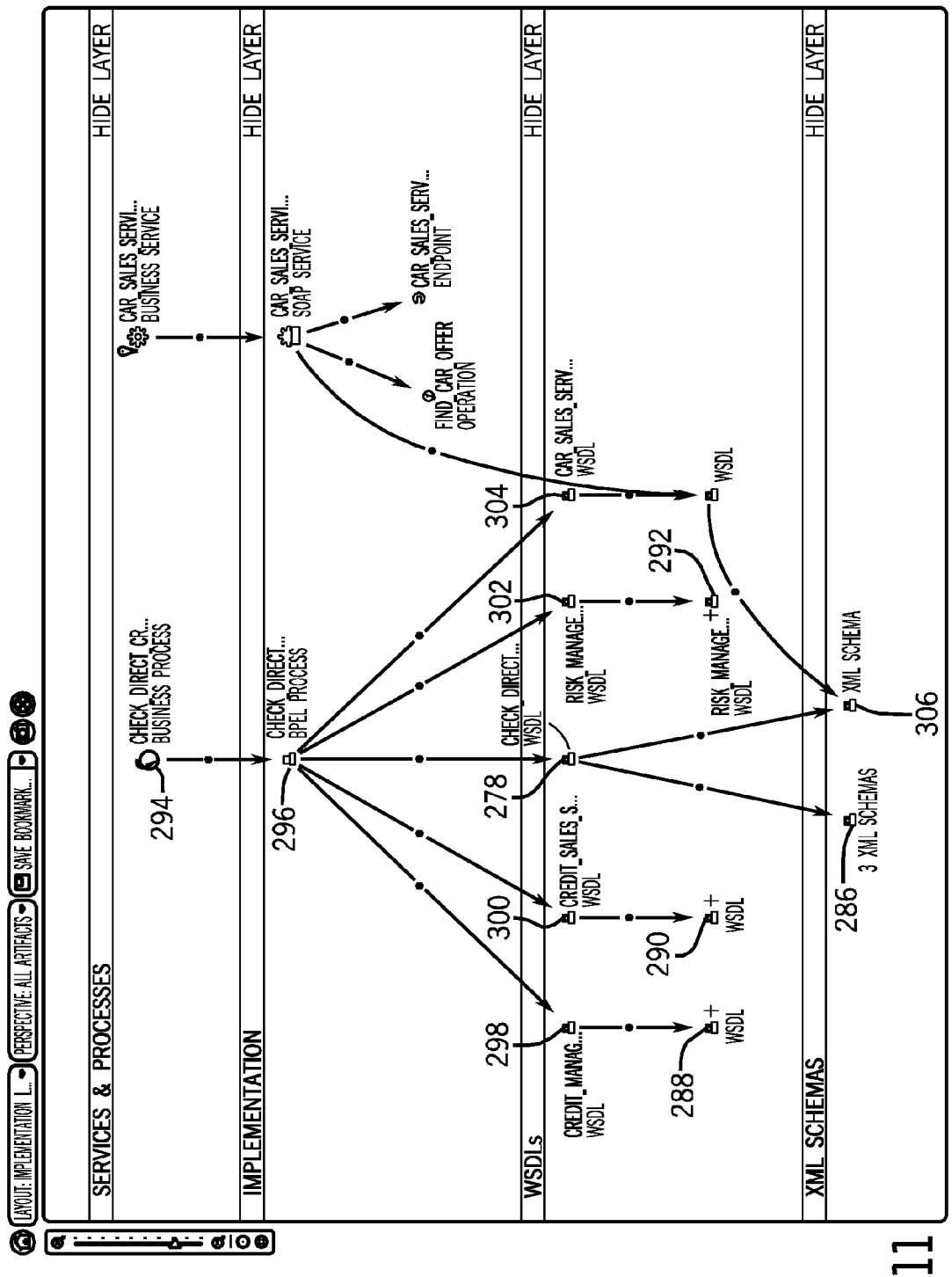
FIG. 11 is a diagram of another exemplary layered layout visualization of a software system, in accordance with an embodiment.

In addition to nodes representing individual entities interconnected in a hierarchical structure, the visualization may include group nodes and incomplete nodes. In some embodiments, similar nodes (i.e., siblings) may be grouped based on their importance. In one embodiment, the visualization tool collapses nodes into group nodes based on a level of importance defined by the user via the Perspectives Module 124 and a distance of the node from the initial node. In some embodiments, the lower the level of importance and/or the larger the distance from the initial node, the more likely that similar nodes will collapse and be displayed as a group node. When nodes are collapsed in this manner, the detailed information associated with the nodes may not be read from the repository 106 since it is not displayed in the visualization. As an example, if an XML Schema is reused in numerous WSDLs, then the WSDL entities may be considered sibling nodes that may be collapsed into a single group node. As another example, and as shown in FIGS. 10 and 11, if a WSDL node 278 uses several XML Schemas (e.g., Schemas 280, 282, 284), then the XML Schemas 280, 282, 284 may be collapsed into a single group node (e.g., a 3 XML Schemas node 286 in FIG. 11).

Group nodes are placed in the highest layer to which they are connected. Thus, nodes and their children nodes may all be in the same layer. All nodes within a particular layer are rendered in a manner that preserves their hierarchies. For instance, the children nodes may be displayed below their parent nodes in the same layer.

If desired, a user may later expand a group node. In some embodiments, the entire group node is expanded and all information associated with each group member may be read from the repository 106 and rendered for display in the visualization. Alternatively, the user may first review a list identifying the members of the group node and then select particular nodes to add to the visualization.

Incomplete nodes are nodes that are far removed from the initial node. In some embodiments, an incomplete node is displayed to the user without showing all (or any) of the node's relationships. If a user elects to expand an incomplete node, then the missing relationships can be read from the repository 106 and added to the visualizations.

Nodes also can be collapsed, which is the inverse of expansion. If a user collapses a node, then the entire sub-tree associated with that node also is collapsed and the details hidden. For instance, in FIG. 11, WSDL nodes 288, 290 and 292 have been collapsed and their details hidden.

Preservation of Hierarchies.

System architectures generally have a hierarchical structure. This hierarchical structure is defined by relationships between various entities of the system. For instance, a component may have sub-components; a process may have sub-processes; a project may have content or documentation; etc. These relationships typically are provided by the system model(s) 104 that are read from the repository 106. Identifying the hierarchical structure and rendering it for display greatly facilitates an overall understanding of the software system. For instance, with reference to FIG. 12, because the hierarchy has been preserved, a user can easily discern that the business process (i.e., the node 294 in the topmost layer 270) is implemented by a BPEL script (i.e., node 296) that imports five WSDLs (i.e., nodes 278, 298, 300, 302, 304), where the WSDL node 278 imports four XML Schemas (i.e., nodes 280, 282, 284 and 306).

Not all relationships that are included in the system model(s) 104 may define hierarchies. Thus, embodiments of the invention enable users to specify which types of relationships in the system model(s) 104 give rise to hierarchical relationships that should be reflected in the visualization. Instances of these specified relationships then can be treated in an appropriate manner when rendering the visualization layout.

Regardless of the manner in which the visualization is presented to the user or manipulated by the user when displayed, the hierarchical structure is preserved. In an exemplary embodiment, this hierarchical structure is constructed in accordance with the flow diagram shown in FIG. 2. As described above, a graph of the system is generated from the information maintained in the system repository 106, where the graph includes nodes which represent the various entities and edges interconnecting nodes that represent the relationships between entities (blocks 202-206). After the hierarchies are identified (block 214), all non-structural edges (i.e., the edges which have not been designated as defining a hierarchy) are removed from the graph (block 216). Typically, the resultant graph is an acyclic oriented graph. However, in the event that the graph contains cycles, these cycles are removed by removing edges of the nodes having the least number of incoming edges (block 218). Once all cycles are eliminated (i.e., an acyclic graph remains), the layout is computed so that the nodes are in layers and the hierarchical edges point from the upper layers towards the lower layers (block 220). In some embodiments, the width of the nodes may be computed as the sum of the widths of all child nodes and the non-structural edges that were originally removed may be added back to the layout. The full graph is then rendered so that a layered layout visualization can be displayed to the user (block 222).

Perspectives Module.

While a visualization that reflects the overall structure of the system is beneficial, the visualization should not overwhelm the user with too much information or provide information in which the user is not interested. For example, if a particular user would like to analyze the structure of composite services, the user may not be interested in details of endpoints, operations and XML Schemas defining interfaces of the services, but might still wish to know where those types of entities fit into the structure. Additionally, the user likely will not at all be interested in viewing Documentation describing the services.

Figure 13:
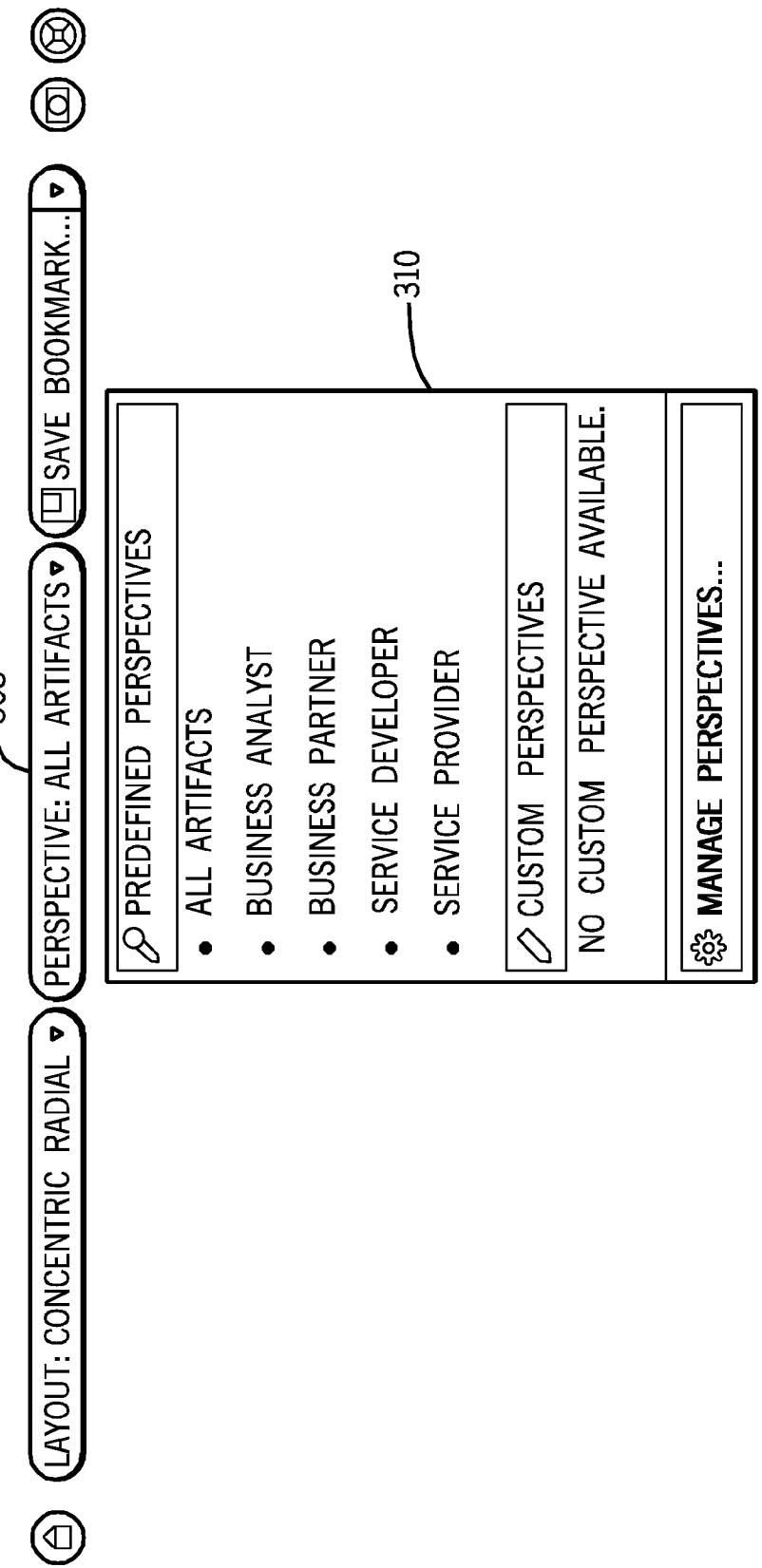
FIG. 13 is an exemplary pulldown menu presenting perspective options to a user, in accordance with an embodiment.

Accordingly, when generating a visualization, exemplary embodiments provide flexibility to select only those entities and those details that the particular user wants to see. In some embodiments, tailoring of the visualization in this manner is enabled by the Perspectives Module 124 which presents to the user various filtering options. As an example, with reference to FIG. 13, selection of the Perspectives button 308 presents a pulldown menu 310 of Predefined Perspectives, Custom perspectives, and the option to Manage Perspectives.

Figure 14:
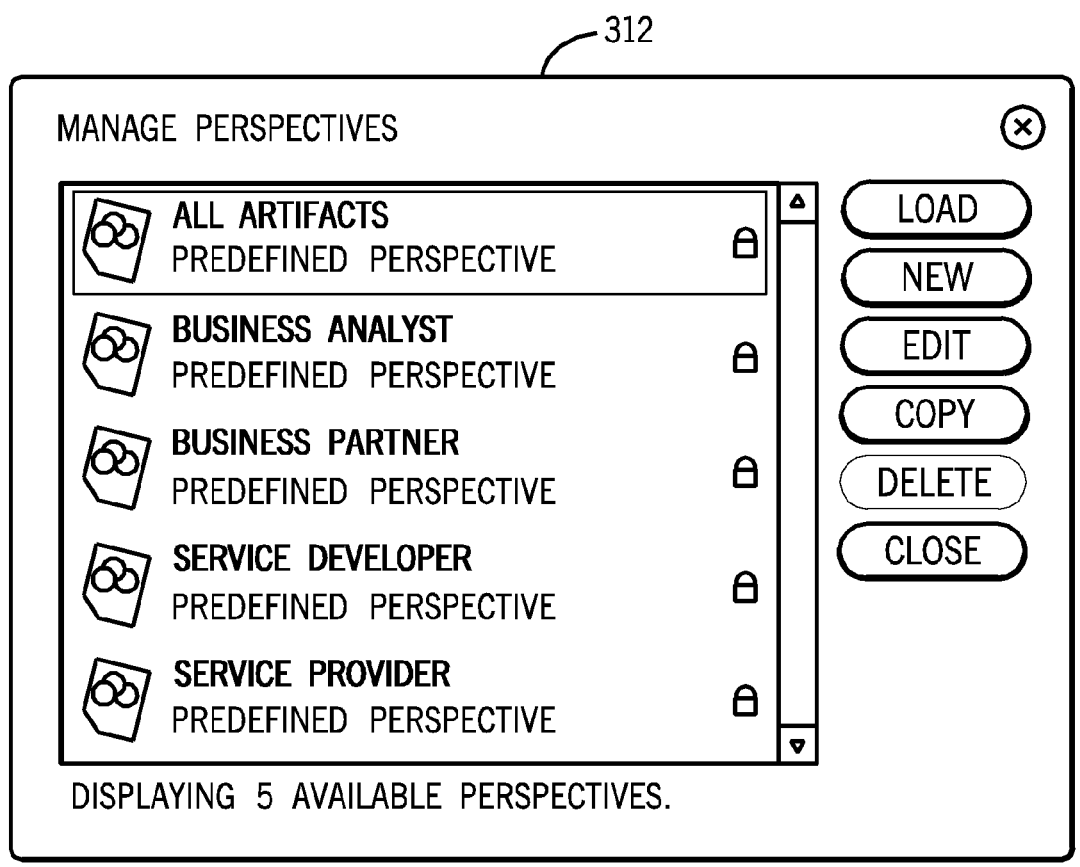
FIG. 14 is another exemplary window presented to a user of an exemplary visualization tool, in accordance with an embodiment.
Figure 15:
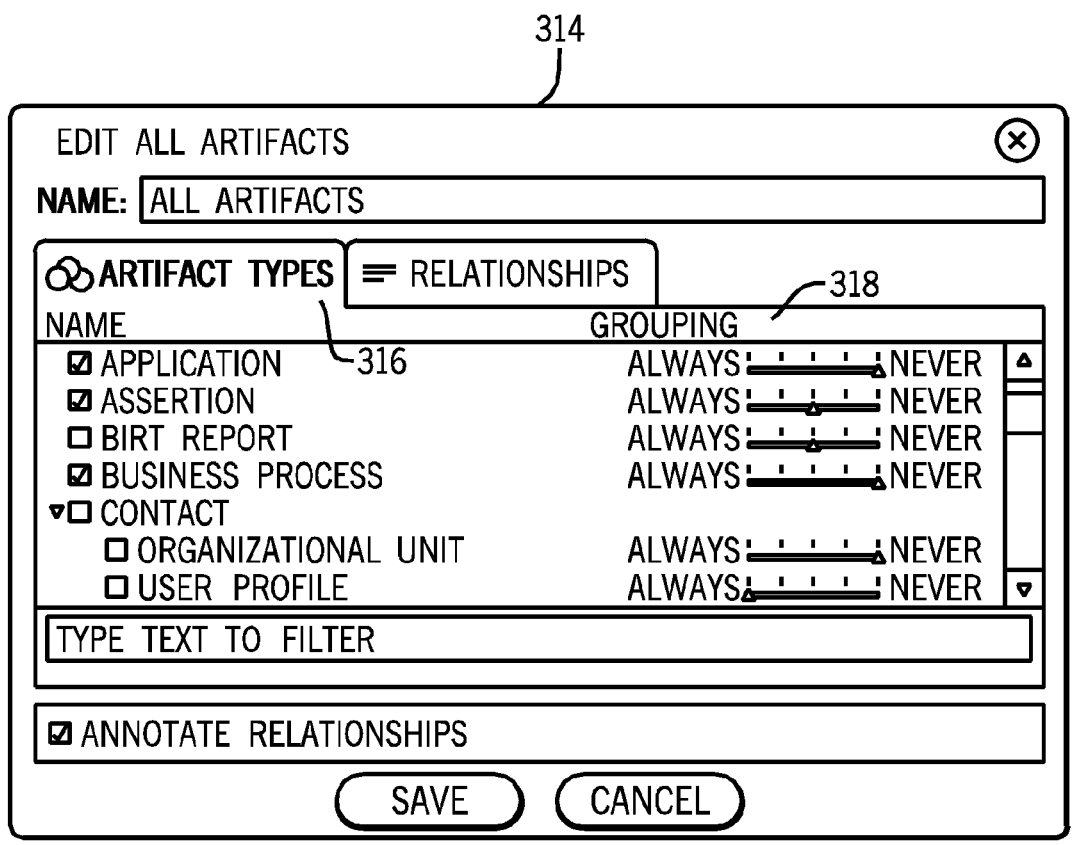
FIG. 15 is another exemplary window presented to a user of an exemplary visualization tool, in accordance with an embodiment.

Selection of the Manage Perspectives option displays the Manage Perspectives window 312 in FIG. 14. Window 312 provides the user with the options of defining a new perspective and editing a predefined perspective. In the example shown in FIG. 14, the predefined perspectives include, for instance, All Artifacts, Business Analyst, Business Partner, Service Developer, Service Provider, etc.

Any of the listed perspectives can be selected for editing. For example, selection of the "All Artifacts" perspective for editing displays an Edit window 314 that enables the user to select/deselect Artifact Types 316 (i.e., entities) for display (e.g., Application, Assertion, Business Process, Documentation, Endpoints, Operations, XML Schemas, etc.). The user also can specify the importance of each selected entity via the corresponding Grouping 318 indicator. For entities that are important to the user, the user may adjust the Grouping 318 indicator to "Never," indicating that the entity should not be grouped with other similar entities and that all detail associated with that entity should be displayed. Similarly, adjustment of the Grouping 318 indicator to "Always" indicates a low level of importance and a corresponding low level of displayed detail. In other embodiments, other types of importance indicators may be used. For instance, the user may select or input numerical values or grades to indicate a level of importance of viewing the details associated with types of entities.

In some embodiments, the specified level of importance may dictate whether the corresponding entities will be displayed as group nodes having collapsed details. While in the embodiment shown, the importance indicator dictates the extent to which the corresponding entities will be displayed as group nodes having collapsed detail, in a more general sense, the amount of detail that is displayed will reflect the specified level of importance. Thus, a lowered level of importance will result in a lower level of detail. In some embodiments, the user also may indicate that certain types of entities (e.g., Documentation) should be filtered out altogether. Filtered-out nodes will not be displayed in the visualization.

Figure 16:
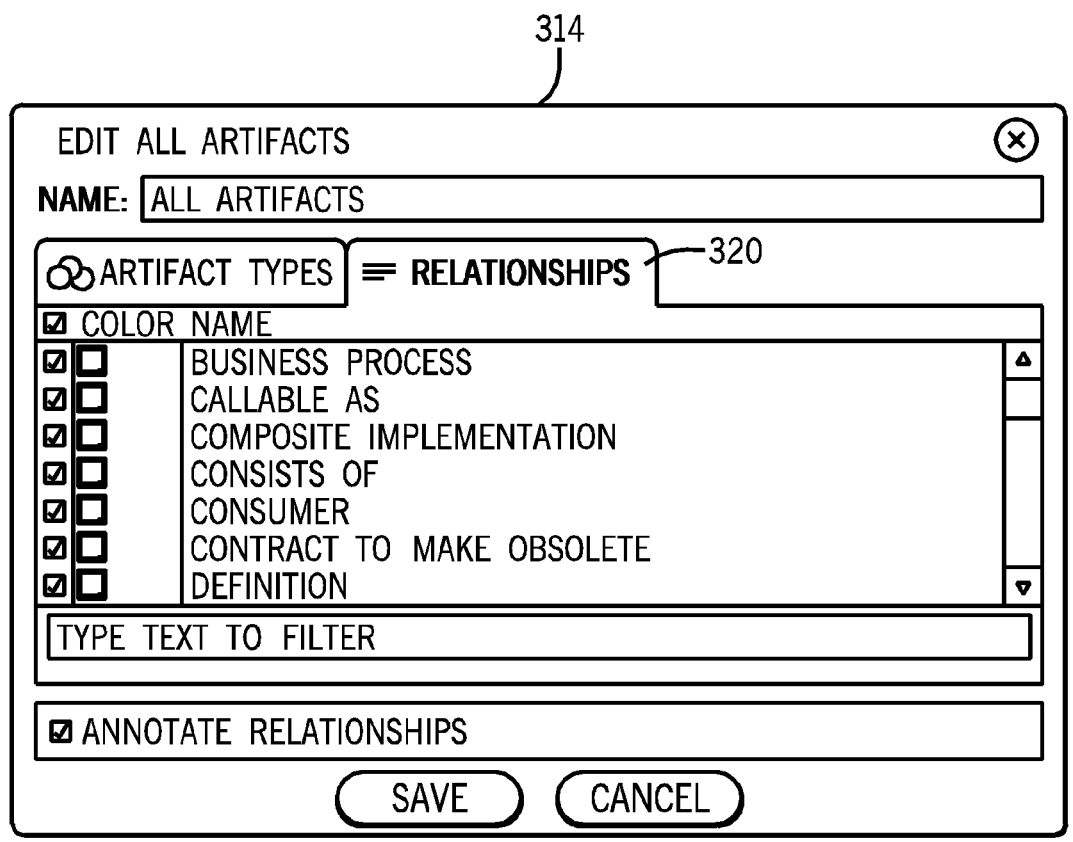
FIG. 16 is another exemplary window presented to a user of an exemplary visualization tool, in accordance with an embodiment.

In some embodiments, the user also may specify the manner in which entity relationships should be displayed in the visualization. As shown in FIG. 16, the Relationships tab 320 in the Edit window 314 provides a list of types of relationships between entities. The user can select which relationships should be displayed and may even specify the color of the edge representing each particular type of relationship. Relationships that are not selected are not displayed.

User Interaction.

Once the visualization is rendered and displayed, the user can interact with the visualization to fine tune it to meet the user's needs. For instance, after examining relationships between particular entities, a user may want to increase or decrease the detail level by expanding or collapsing nodes. As an example, the user may find it useful to collapse a service entity so that its internal details are not displayed, but may want to closely scrutinize the details of other services whose dependencies need to be examined.

Figure 12:
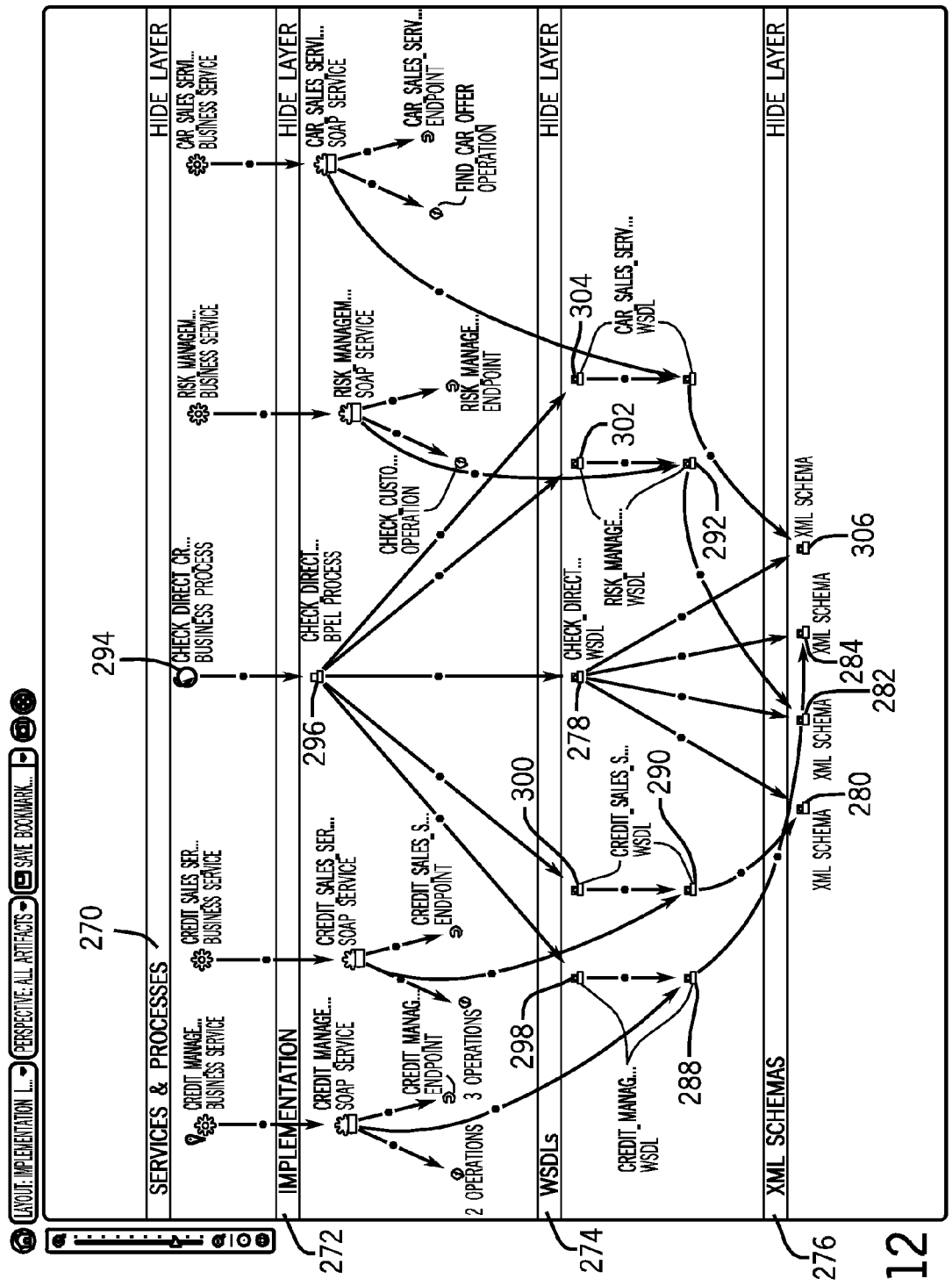
FIG. 12 is a diagram of an exemplary layered layout visualization of a software system, in accordance with an embodiment.

A user may also reposition nodes. Although the layout that is rendered is generally well organized, the user may want to change the position of certain nodes (while still maintaining the layered layout) so that the visualization is more appealing to the user. For instance, the user may want to emphasize a particular pattern in the visualization. FIG. 12 illustrates an example in which the nodes in the Services & Processes Layer 270 in FIG. 10 have been repositioned so that the visualization has a more symmetrical look Some embodiments may also support impact and dependency analyses. As an example, a user can select an arbitrary node of the system and, using the visualization, visualize its impact by highlighting impacted entities, their dependencies and/or entities relating to the impacted entities. Highlighting the visualization in this manner can provide additional context which facilitates the user's overall understanding of the system.

It should be understood that, in various embodiments, the visualization technique described with reference to FIG. 2 may include additional and/or different steps than those shown in FIG. 2. In some embodiments, certain steps may be omitted and/or the steps may be performed in different sequences.

Instructions of software described above (including all or portions of the layered visualization tool 102 of FIG. 1 and the technique illustrated in FIG. 2) are loaded for execution on a processor (such as the processor 112 in FIG. 1). A processor can include a microprocessor, microcontroller, processor module or subsystem, programmable integrated circuit, programmable gate array, or another control or computing device. As used here, a "processor" can refer to a single component or to plural components (e.g., one CPU or multiple CPUs). Plural components may perform computing tasks in a distributed manner.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A system to generate a layered visualization of a software system, the system comprising:
   a storage device to store a model of a software system, the model defining a plurality of entities of the software system and relationships among the entities;
   at least one processor; and
   a visualization tool executable on the at least one processor to:
      generate nodes representing the entities of the software system model;
      assign the generated nodes to layers in a set of ordered layers in accordance with rules associated with the layers to generate a layered layout, including the layers, of the software system, wherein the assigning includes evaluating, for a given one of the nodes, the rules and determining that the given node satisfies a particular one of the rules, the given node being assigned to the layer associated with the particular rule;
      render an interactive visualization of the layered layout for display;
      receive importance levels for respective ones of the nodes, wherein at least two of the importance levels are different; and
      group at least some of the nodes into a group node in the interactive visualization according to the importance levels of the nodes.

2. The system as recited in claim 1, wherein the visualization tool is further executable to:
   determine a hierarchical structure of the software system based on the relationships among the entities, and
   calculate edges interconnecting the generated nodes based on the hierarchical structure, wherein the layered layout includes the edges, and wherein the edges point from nodes in upper layers of the layered layout towards nodes in lower layers of the layered layout.

3. The system as recited in claim 2, wherein, in response to a user input, the visualization tool is executable to re-assign the generated nodes to a different set of ordered layers in accordance with the rules associated with the layers of the different set, wherein the different set of ordered layers maintains the hierarchical structure.

4. The system as recited in claim 1, wherein the visualization tool further includes a perspectives module to define a view for the interactive visualization, wherein the view specifies levels of detail to display in the interactive visualization, and wherein the visualization tool is executable to render the interactive visualization of the layered layout in accordance with the view.

5. The system as recited in claim 4, wherein the visualization tool is executable to collapse nodes assigned to a same layer into another group node based on specified levels of detail associated with the collapsed nodes.

6. The system as recited in claim 4, wherein the view further specifies entity relationships to display in the interactive visualization, and wherein the visualization tool is executable to exclude nodes from the interactive visualization in accordance with the view.

7. The system as recited in claim 2, wherein the visualization tool is executable to reposition a selected node within the corresponding layer in response to a user interaction with the interactive visualization.

8. The system as recited in claim 1, wherein the visualization tool is executable to expand the group node in response to a user interaction with the interactive visualization.

9. The system as recited in claim 1, wherein the assigning further includes evaluating, for a second one of the nodes, the rules and determining that the second node satisfies a second one of the rules, wherein the second node is assigned to another of the layers associated with the second rule.

10. The system as recited in claim 1, wherein the importance levels for respective ones of the nodes comprise respective numerical values.

11. The system as recited in claim 1, wherein the visualization tool is executable to receive the importance levels prior to performing the grouping of the at least some of the nodes into the group node.

12. An article comprising a non-transitory computer-accessible storage medium containing instructions of software code that, when executed by a computer processing device, cause the computer processing device to:
   construct a graph of a software system based on information associated with a model of the software system, the model defining entities of the software system and relationships among the entities, the graph including nodes representing the entities and edges representing the relationships;
   divide, by a visualization tool, the nodes into layers in accordance with rules associated with the layers;
   identify, by the visualization tool, a hierarchical structure of the software system based on the relationships;
   compute, by the visualization tool, an ordered layout of the nodes in the layers and the edges in accordance with the hierarchical structure, wherein the edges point from nodes in upper layers towards nodes in lower layers;
   render, by the visualization tool, the ordered layout including the layers including the divided nodes to generate an interactive visualization for display;

receive, by the visualization tool, importance levels for respective ones of the nodes, wherein at least two of the importance levels are different; and group, by the visualization tool, at least some of the nodes into a group node in the interactive visualization according to the importance levels of the nodes.

13. The article as recited in claim 12, wherein the instructions further cause the processing device to compute the ordered layout by filtering from the ordered layout entities and details in accordance with a perspective defined by a user.

14. The article as recited in claim 13, wherein the instructions further cause the processing device to filter details by excluding nodes from the ordered layout based on relationships of the excluded nodes with other nodes.

15. The article as recited in claim 12, wherein, in response to a user input, the instructions further cause the processing device to:

re-divide the nodes into different layers in accordance with rules associated with the different layers;

re-compute the ordered layout while preserving the hierarchical structure; and render the re-computed ordered layout to generate a different interactive visualization for display.

16. The article as recited in claim 12, wherein the instructions further cause the processing device to reposition a selected node within the corresponding layer in response to a user interaction with the interactive visualization.

17. The article as recited in claim 12, wherein the dividing comprises:

evaluating, for a given one of the nodes, the rules;

determining whether the given node satisfies a particular one of the rules; and assign the given node to the layer associated with the particular rule.

18. The article as recited in claim 12, wherein the importance levels for respective ones of the nodes comprise respective numerical values.

19. The article as recited in claim 12, wherein receiving the importance levels is performed before the grouping of the at least some of the nodes into the group node.

20. A method comprising:

generating a visualization of a software system from a software system model stored in a repository, the software system model defining entities and relationships among the entities, wherein the generating of the visualization of the software system is performed by executing machine-readable instructions on at least one processor, and comprises:

generating nodes representing the entities of the model to be visualized;

generating edges interconnecting the nodes in accordance with the relationships defined in the model;

assigning the nodes to layers in accordance with rules associated with the layers, wherein the assigning includes evaluating, for a given one of the nodes, the rules and determining that the given node satisfies a particular one of the rules, the given node being assigned to the layer associated with the particular rule;

identifying a hierarchical structure of the software system based on the relationships;

determining an ordered layout of the nodes in the assigned layers arranged in accordance with the hierarchical structure, wherein the edges interconnecting the nodes point from upper layers towards lower layers;

rendering a visualization of the ordered layout including the assigned layers for display;

receiving importance levels for respective ones of the nodes, wherein at least two of the importance levels are different; and grouping at least some of the nodes into a group node in the visualization according to the importance levels of the nodes.

21. The method as recited in claim 20, wherein determining the ordered layout comprises filtering from the ordered layout entities and details associated with the filtered entities in accordance with a perspective defined by a user.

22. The method as recited in claim 21, wherein the filtering comprises excluding nodes from the ordered layout based on relationships of the excluded nodes with other nodes.

23. The method as recited in claim 20, further comprising:

re-assigning the nodes to different layers in accordance with rules associated with the different layers;

re-determining an ordered layout of nodes in the different layers arranged in accordance with the hierarchical structure, wherein the edges interconnected the nodes in the different layers point from upper layers towards lower layers; and rendering a visualization of the re-determined ordered layout for display.

24. The method as recited in claim 20, wherein the assigning further includes evaluating, for a second one of the nodes, the rules and determining that the second node satisfies a second one of the rules, wherein the second node is assigned to another of the layers associated with the second rule.

25. The method as recited in claim 20, wherein the importance levels for respective ones of the nodes comprise respective numerical values.

* * * * *